(12) United States Patent
Caronna et al.

(10) Patent No.: US 6,466,132 B1
(45) Date of Patent: *Oct. 15, 2002

(54) INCIPIENT FAILURE INDICATION APPARATUS FOR AN ENVIRONMENT CONTROL SYSTEM

(75) Inventors: Cosimo Caronna; Danny R. Burdette, both of Murfreesboro, TN (US)

(73) Assignee: International Comfort Products Corporation (USA), Lewisburg, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/766,808

(22) Filed: Jan. 22, 2001

Related U.S. Application Data

(63) Continuation-in-part of application No. 09/312,325, filed on May 14, 1999, now Pat. No. 6,225,907.

(51) Int. Cl.$^7$ ............................................... G08B 17/00
(52) U.S. Cl. ........................ 340/584; 340/588; 340/585; 340/596; 340/589; 340/635; 340/870.17
(58) Field of Search ................................ 340/584, 588, 340/585, 596, 589, 635, 870.17

(56) References Cited

U.S. PATENT DOCUMENTS

| | | | | |
|---|---|---|---|---|
| 4,882,564 A | * | 11/1989 | Manroe et al. ............. | 340/449 |
| 4,903,759 A | * | 2/1990 | Lapeyrouse ................ | 165/11.1 |
| 5,107,918 A | * | 4/1992 | McFarlane et al. .......... | 165/12 |
| 5,454,510 A | * | 10/1995 | Manson et al. .............. | 236/46 |
| 5,684,463 A | * | 11/1997 | Diercks et al. ........... | 3470/584 |
| 6,255,907 B1 | * | 5/2001 | Derryberry et al. ......... | 340/584 |

* cited by examiner

Primary Examiner—Daniel J. Wu
Assistant Examiner—Tai T. Nguyen

(74) Attorney, Agent, or Firm—Baker & Daniels

(57) ABSTRACT

An incipient failure indication apparatus for an environmental control system which includes a heat exchanger through which air flows and a temperature control thermostat. The indication apparatus includes an indicator having an alarm in communication with a control board, the control board in communication with the thermostat. The alarm has a visual indicator and/or an aural indicator, whereby the attention of a person is attracted to the indicator upon activation of the alarm. A first temperature sensor is disposed on the upstream side of the heat exchanger and a second temperature sensor is disposed on the downstream side of the heat exchanger, whereby the temperature sensors respectively sense the temperature of the air upstream and downstream of the heat exchanger. The first and second temperature sensors are in communication with the control board, and the control board has means for comparing the temperatures sensed thereby. The control board also includes means for activating the alarm in response to recognizing a difference in temperatures sensed by the first and second temperature sensors which is one of greater than and less than a predetermined value. The apparatus may also be provided with a timer, a reset switch in communication therewith, a filter service time indicator, and means for activating the filter service time indicator a predetermined period measured by the timer after the reset switch is activated. The apparatus may also be provided with means for activating a remote alarm upon activation of the alarm, whereby persons outside of a building serviced by the environmental control system are notified of an incipient failure of the environmental control system.

5 Claims, 4 Drawing Sheets

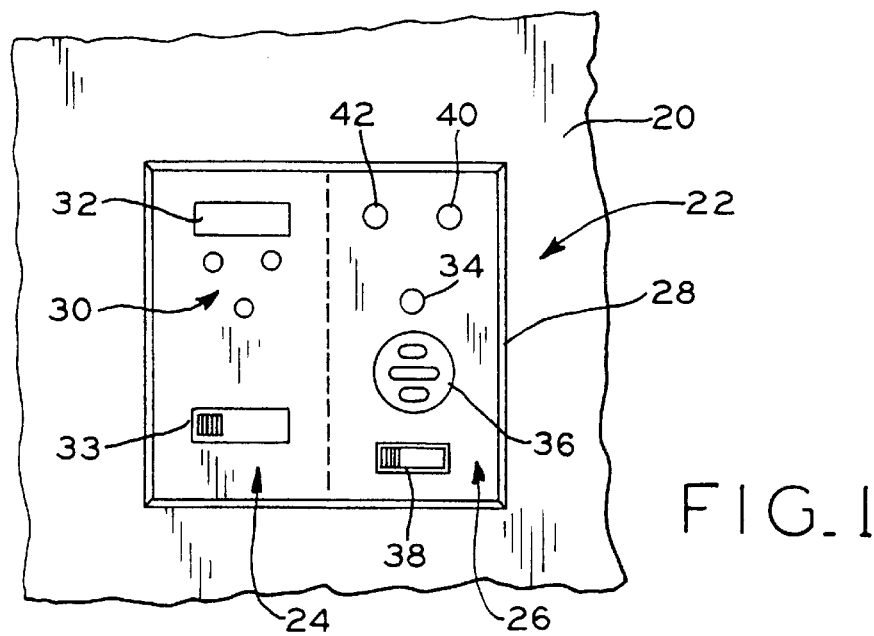
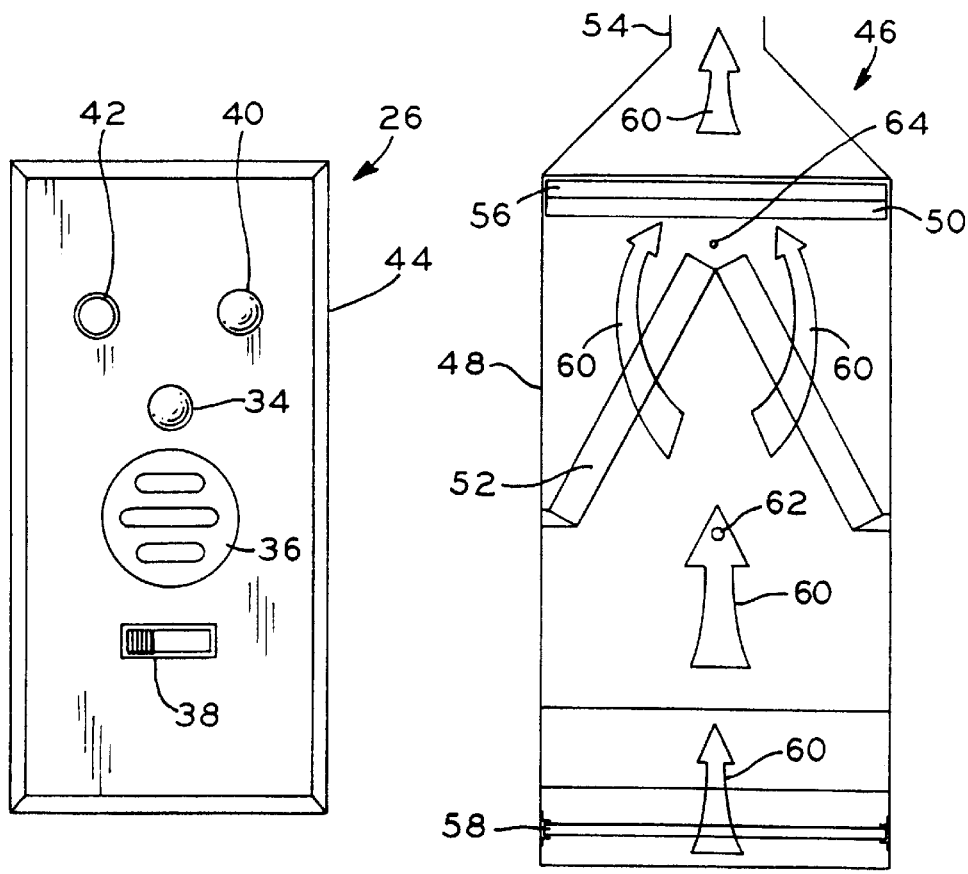
FIG_1
FIG_2
FIG_3

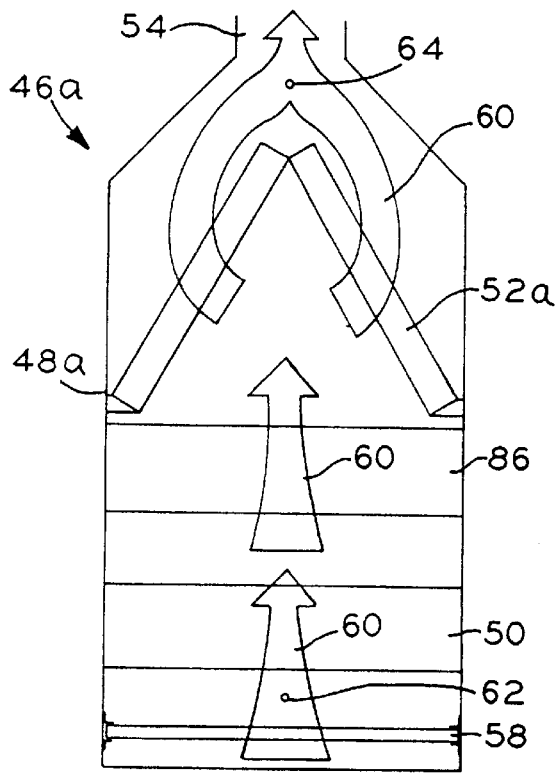
FIG_5
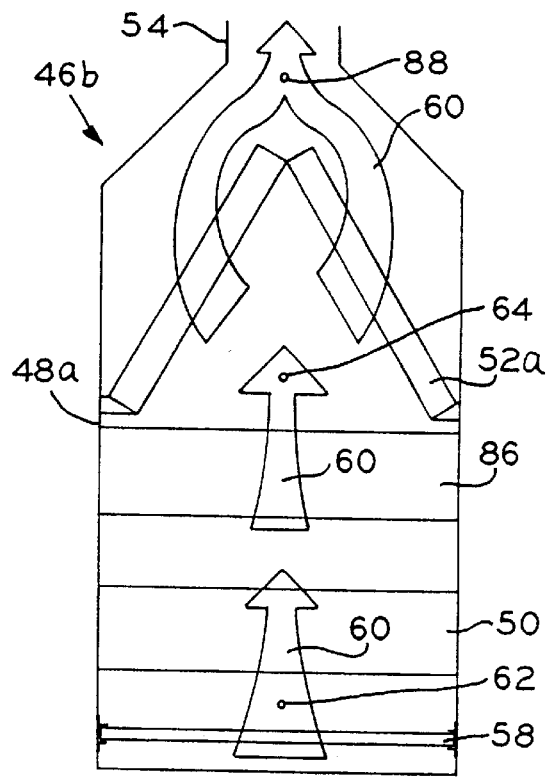
FIG_6
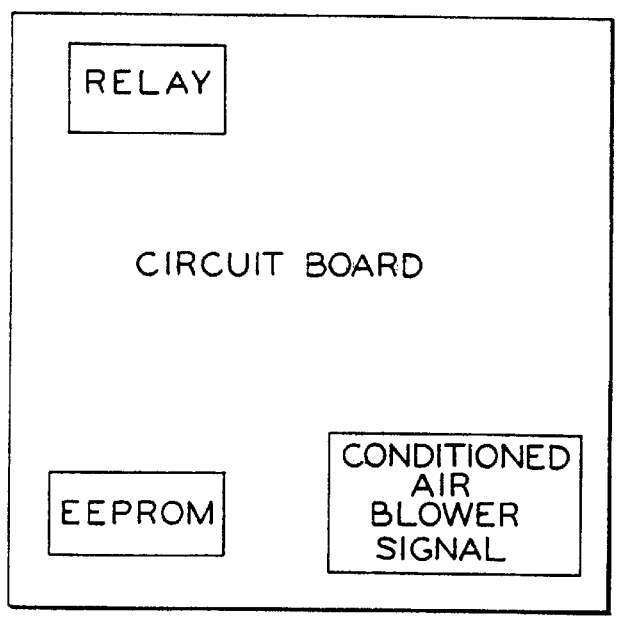
FIG_8

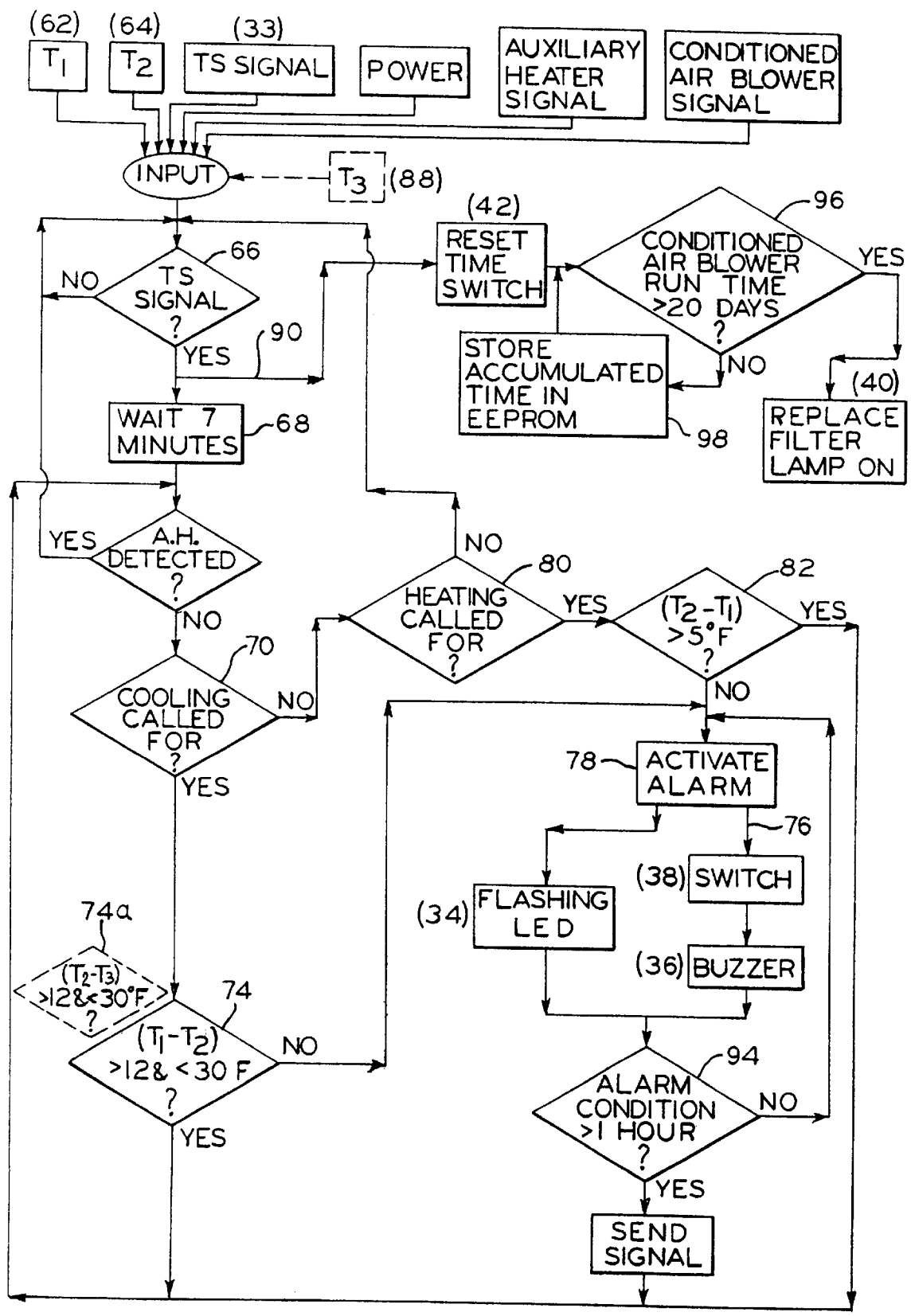
FIG_7

INCIPIENT FAILURE INDICATION APPARATUS FOR AN ENVIRONMENT CONTROL SYSTEM

RELATED APPLICATIONS

This is a continuation-in-part of U.S. patent application Ser. No. 09/312,325 filed May 14, 1999, now U.S. Pat. No. 6,225,907.

BACKGROUND OF THE INVENTION

The present invention relates to building heating and cooling systems, particularly as used in a residence, and performance monitoring apparatuses therefor.

Rather than failing suddenly and completely, the environmental control system which controls the temperature of the interior of a building may experience a performance degradation which may not be immediately noticed by the occupants of the building, and which may occur during a time period over which the performance of the system degrades continually, eventually leading to a complete failure. Often, building occupants notice the degradation in performance only when they sense that their environment is uncomfortably hot or cold, by which time the environmental control system may have completely failed. At this point, the occupants are left with an inoperable environmental control system, and must contact an appropriate repair facility to investigate the problem and make the appropriate repairs. Also, once the occupants notice that the system is not operating properly, they are left to their own devices to contact an appropriate repair facility to undertake repairs. Therefore, a considerable period of time may pass before the repair personnel are contacted and arrive to address the failure, during which time the occupants may be completely without heat or air conditioning.

In some cases, the gradual degradation of system performance, which may go unnoticed by the occupants, may be indicative of a problem which will eventually result in a sudden system failure or other types of concerns. For example, in some cases, if the refrigerant charge level of an air conditioning system drops to a level which is too low to adequately carry oil back to the compressor for lubrication of some interfacing surfaces therein, excessive wear or seizure of the compressor may result.

Further, many environmental control systems utilize a filter for cleaning the air which is heated or cooled by the environmental control unit. These filters require cleaning or replacement, usually by the occupants, after a period of use. A dirty filter restricts airflow through the unit, which inhibits the system's ability to force air through the ductwork and interchange the air in the building. Often, replacement of the filter is neglected by the user, and the performance of the system consequentially degrades.

A way to identify environmental control system performance degradation before complete system failure occurs is thus highly desirable. Further, a way of automatically contacting the appropriate repair facility, so that personnel at the facility will become aware and initiate repair of the failing system is also desirable. Additionally, a reminder by which the occupants will be notified that the filter should be replaced or at least inspected, the filter having completed its anticipated normal use period, is also highly desirable.

SUMMARY OF THE INVENTION

The present invention addresses each of the above issues by providing notice to the occupants and, in certain embodiments, an appropriate repair facility, of a degradation in environmental control system performance.

The present invention provides an incipient failure indication apparatus for an environmental control system which includes a heat exchanger through which air flows and a temperature control thermostat. The indication apparatus includes an indicator or annunciator having an alarm in communication with a control board, the control board in communication with the thermostat. The alarm has a visual indicator and/or an aural indicator, whereby the attention of a person is attracted to the indicator upon activation of the alarm. A first temperature sensor is disposed on the upstream side of the heat exchanger and a second temperature sensor is disposed on the downstream side of the heat exchanger, whereby the temperature sensors respectively sense the temperature of the air upstream and downstream of the heat exchanger. The first and second temperature sensors are in communication with the control board, and the control board has means for comparing the temperatures sensed thereby. The control board also includes means for activating the alarm in response to recognizing a difference in temperatures sensed by the first and second temperature sensors which is one of greater than and less than a predetermined value.

An embodiment of the present invention may also provide means for activating a remote alarm upon activation of the alarm, whereby persons outside of a living space serviced by the environmental control system are notified of an incipient failure of the environmental control system.

Further, an embodiment of the present invention may also provide a timer and a reset switch in communication therewith, a filter service time indicator, and means for activating the filter service time indicator a predetermined period measured by the timer after the reset switch is activated.

BRIEF DESCRIPTION OF THE DRAWINGS

The above-mentioned and other features and advantages of the present invention, and the manner of attaining them, will become more apparent and the invention will be better understood by reference to the following description of embodiments of the invention taken in conjunction with the accompanying drawings, wherein:

FIG. 1 is a front view of a thermostat and an incipient failure apparatus indicator mounted in a common housing, the housing mounted to an interior wall of a building;

FIG. 2 is a second embodiment of an incipient failure apparatus indicator having an individual housing;

FIG. 3 is schematic of a heat pump-type of environmental control, to which the inventive incipient failure indicator apparatus is adapted;

FIG. 5 is a schematic of a first combination furnace and air conditioner-type environmental control unit, to which the inventive incipient failure indicator apparatus is adapted;

FIG. 6 is a schematic of a second combination furnace and air conditioner-type environmental control unit, to which an alternative embodiment of the inventive incipient failure indicator apparatus is adapted;

FIG. 7 is a flow chart illustrating the control logic of another embodiment of the inventive incipient failure indicator apparatus to the environmental control unit of FIG. 3; and FIG. 8 is a block diagram representing the relative locations of the circuit board.

Figure 4:
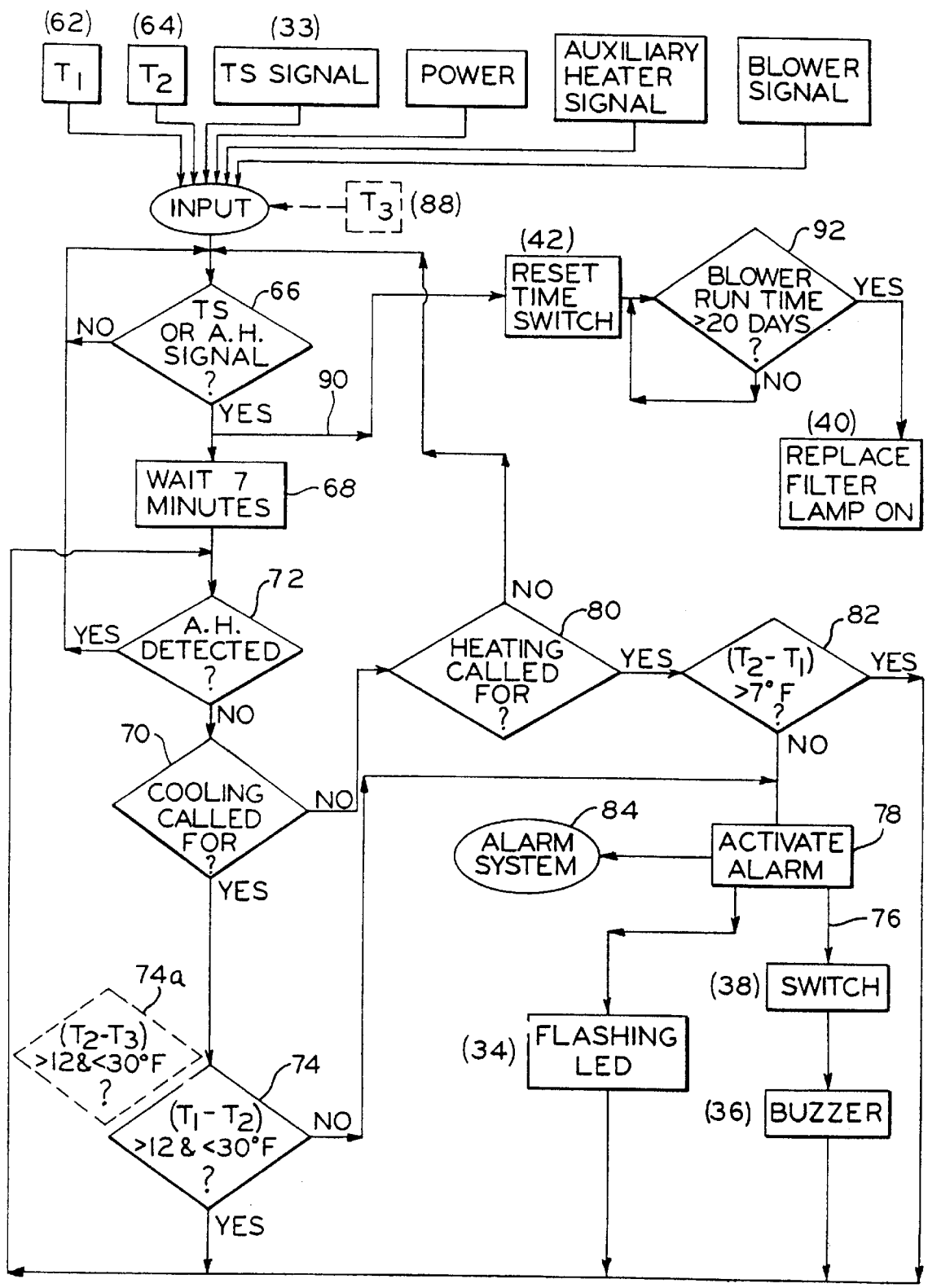
FIG. 4 is a flow chart illustrating the logical control of one embodiment of the inventive incipient failure indicator apparatus to the environmental control unit of FIG. 3.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, and such exemplifications are not to be construed as being exhaustive or to limit the scope of the invention in any manner.

DETAILED DESCRIPTION OF THE INVENTION

Referring to FIG. 1, there is shown attached to interior wall 20 of a building combination thermostat and incipient failure indicator unit 22. Thermostat 24 and indicator unit or annunciator 26 are enclosed in common housing 28 which gives the combination a unified appearance. Thermostat 24 is of an electrical type well-known in the art, and includes controls 30 and display 32 and may regulate both heating and cooling operations. Thermostat 24 may be provided with manually actuated 3-position heat/off/cool selector switch 33, or may automatically choose which of heating and cooling operations is to be performed.

Indicator unit 26, according to one embodiment of the present invention includes a flashing lamp or light emitting diode (LED) 34, and speaker 36 through which a buzzer or other aural notice may be issued. LED 34 and speaker 36 are activated upon recognition of an incipient environmental control system failure as disclosed herein below. Indicator unit 26 also comprises on/off switch 38 by which the speaker 36 may be disabled without interfering with the operation of flashing LED 34, the illuminated LED continuing to remind the user that an incipient failure of the environmental control system has been detected.

Indicator unit 26 further includes lamp or LED 40 which indicates to the user that the filter of the environmental control unit should be cleaned, replaced or at least inspected, the predetermined period of time over which it has been in service having elapsed. Indicator unit 26 includes push button reset switch 42 which resets the timer which measures the period of time over which air flows through the filter. Notably, LEDs 34 and 40 are of different colors (e.g., in one embodiment LED 34 is red and LED 40 yellow) thereby quickly indicating to the occupant the nature of the warning issued by the indicating unit. Also, while it is envisioned that LED 34 will flash, LED 40 will remain steadily illuminated. Further, although not shown, each of the switches and LEDs of indicator unit 26 are appropriately labeled to apprise the occupant of the type of the warning being issued by the indicator unit.

Referring now to FIG. 2, there is shown a second embodiment of an indicator unit according to the present invention, here indicator unit 26 is not housed in a common housing with the thermostat, as shown in FIG. 1, but rather is provided with a separate housing 44. Indicator unit 26, housed in housing 44, is attached to an interior wall of the building adjacent to an existing thermostat such as thermostat 24 which is also provided with a separate housing (not shown), facilitating ready adaptation of the inventive incipient failure indicator unit to a previously-installed environmental control system. Alternatively, in applications where the environmental control unit is located in a closet readily accessible to the occupant, housing 44 for indicator unit 26 may be attached directly to the airhandler or furnace housing thereof. If so installed, the aural alarm issued by the indicator unit may be easily heard by the occupant to attract the occupant's attention to the closet and the indicator unit. As described above, housing 44 is provided with appropriate labels associated with each of the switches and LEDs of indicator 26 to immediately apprise the occupant of the type of warning being issued thereby.

Referring now to FIG. 3, there is shown a first embodiment of an environmental control unit to which the inventive incipient failure indicator apparatus is adapted. Environmental control unit 46 is of the heat pump variety and is contained within housing 48. Environmental control unit 46 includes blower 50 for drawing interior air into housing 48, and forcing the air through refrigerant-to-air heat exchanger 52. As shown, heat exchanger 52 is an "A" coil-type heat exchanger which, as is well known in the art, serves as a refrigerant system evaporator during cooling or air conditioning operation, and as a refrigerant system condenser during heating operation, the refrigerant system to which A coil 52 is connected is not shown. Heat pumps are well-known in the art, and thus a discussion of their refrigerant system componentry and operation is not provided herein.

Air heated or cooled by A coil 52 is then directed to ductwork 54, which conveys the heated or cooled air throughout the building. As is typical with heat pump units, environmental control unit 46 is provided with auxiliary heater 56 within housing 48, downstream of A coil 52. The purpose of auxiliary heater 56 is to provide supplemental heat in heat mode. Auxiliary heater 56 is of a known type which may be electrical or hydronic.

Filter 58 is provided to clean the air flowing through housing 48 before it reaches the blower or the heat exchanger. Arrows 60 shown in FIG. 3 indicate the flow of air sequentially through filter 58, A coil 52, blower 50, auxiliary heater 56, and out of housing 48 through ductwork 54.

With the inventive incipient failure apparatus indicator adapted to environmental control unit 46, temperature sensor elements 62 and 64 are placed within housing 48, in the airflow respectively upstream and downstream of A coil 52. Temperature sensor elements 62 and 64 are, in the exemplary embodiment, thermistors (special semiconductor diodes whose conductivity increases with the diode temperature). Alternatively, with appropriate modifications to the control means, sensors 62 and 64 may be thermocouples. So arranged, thermistor 62 senses the temperature of the air flowing through housing 48 before it is heated or cooled by A coil 52, and thermistor 64 senses the temperature of the air flowing through housing 48 after it has been heated or cooled by A coil 52. Note that although thermistor 64 is shown located upstream of auxiliary heater 56, it may alternatively be located downstream thereof. As will be discussed further below, when auxiliary heater operation has been detected, the incipient failure warning apparatus of the present invention becomes inoperational until the need for auxiliary heating has passed and the operation of auxiliary heater 56 has been terminated by the heat pump system control (not shown) which determines whether auxiliary heating is called for and activates auxiliary heater 56.

Referring now to FIG. 4, there is shown one embodiment of the logic associated with the inventive incipient failure indication apparatus. The control board for the logic shown in FIG. 4 is in electrical communication with thermostat 24 and, through thermistors 62, 64, with the interior of environmental control unit 46. In certain embodiments of the present invention, the control board of the incipient failure indication apparatus (not shown) may be comprised of a daughter board directly fitted and electrically connected to a separate mother board (not shown) located on environmental control unit 46 and which controls aspects of environmental control beyond the scope of the present invention. The mother board provides the daughter board with inputs such as, for example, power, an auxiliary heater signal or a blower signal. The daughter board may be designed to be readily fitted onto the mother board, providing easy adaptation of the inventive incipient failure indicator system to certain existing environmental control units. Alternatively, a single control board may be used for control of the environmental control system and incipient failure indication in accordance with the present invention.

The input to the control board of indicator unit 26 includes, referring to the top row of FIG. 4, signals received from thermistors 62 and 64, which are respectively designated T1 and T2. As will be described further hereinbelow, the difference in temperatures sensed by thermistors 62 and 64 is compared to a predetermined value for determining whether the performance of the environmental control system has degraded, indicating an incipient system failure. Note that the thermostat signal is abbreviated "TS" in the flowchart.

Another input to indicator unit 26 is the signal from the thermostat, which indicates whether it is calling for heating or cooling, or if the environmental control system has been turned off (in which case no thermostat signal is received by indicator unit 26). Some environmental control systems may not include air conditioning, and the thermostat signal issued thereby to indicator unit 26 would be only an "on" signal. The logic shown in FIG. 4 and described below would be easily modified to accommodate such a system.

As seen in FIG. 4, low voltage power is also provided to indicator unit 26, and the source thereof may be shared between thermostat 24 and the indicator unit. If the environmental control unit to which the inventive incipient failure indicator apparatus is adapted is a heat pump, as shown in FIG. 3, an auxiliary heater signal will be received by indicator unit 26. The auxiliary heater signal, abbreviated "A.H." in the flowchart, is a digital indication of whether the heat pump controller (not shown, but which may be the above-mentioned mother board) is calling for supplemental heat during heating operation. Finally, a blower signal input is provided to indicator unit 26. The blower signal indicates when blower 50 (FIG. 3) should be operating, and thus drawing air through filter 58.

The control board of the incipient failure indication apparatus first determines whether a thermostat or an auxiliary heating signal is being received. If not, the logic branches to the left as shown in FIG. 4 and back up to the input of flow chart symbol 66, and remains in this loop until a thermostat signal is received and auxiliary heating signal is received. Once this condition exists, the indicator apparatus will wait for a period of time before continuing its function, thus allowing a stabilization period for the environmental control system to reach its steady state operating condition. As shown in symbol 68 of the flow chart of FIG. 4, this waiting period is seven minutes, although it may be slightly shorter and may certainly be longer. Once the seven minute wait has been completed, the logic proceeds downward from symbol 68 to symbol 72.

In symbol 72, the logic of the indicator apparatus control board again determines whether a call for auxiliary heating is being detected. If so, the logic loops back to the input to symbol 66 and remains in this loop, and the apparatus remains on hold, until the auxiliary heating signal has ceased. The above-mentioned seven minute wait is performed (symbol 68) before proceeding again to symbol 72. If an auxiliary heating call is not detected, the logic of the indicator unit control board then determines whether cooling or heating is called for according to the thermostat signal received. If cooling is called for, the logic proceeds downward from symbol 70 to make a comparison of the temperatures sensed by thermistors 62 ($T_1$) and 64 ($T_2$). Symbol 74 indicates that if the sensed temperature difference across A coil 62 is greater than the lower predetermined value of 12° F., and less than the higher predetermined value of 30° F., the environmental control system is assumed to be operating properly, and no incipient failure is anticipated. The logic thus loops back to the input of symbol 72 and continues.

Although symbol 74 indicates that the lower predetermined value to which the difference between $T_1$ and $T_2$ is compared is 12° F., it is envisioned that a slightly smaller lower predetermined value, for example 10° F., may provide adequate detection performance, but will lessen the sensitivity of the indicator apparatus. It is also envisioned that a slightly larger lower predetermined value, for example, 15° F., may also provide adequate detection performance, but may render the indicator apparatus overly sensitive and result in false alarms. Further, although symbol 74 indicates that the higher predetermined value to which the difference between $T_1$ and $T_2$ is compared is 30° F., it is envisioned that a slightly larger higher predetermined value, for example 32° F., may provide adequate detection performance, but will lessen the sensitivity of the indicator apparatus. It is also envisioned that a slightly smaller higher predetermined value, for example, 28° F., may also provide adequate detection performance, but may render the indicator apparatus overly sensitive and result in false alarms. Those skilled in the art will understand that actuation of the alarm in the event of the difference between $T_1$ and $T_2$ being equal to or greater than the higher predetermined value (e.g., 30° F.) may be indicative of degraded airflow performance, perhaps caused by an excessively dirty filter. It is envisioned, however, that substantially satisfactory performance may be obtained by an embodiment in which the sensed temperature difference between sensors 62 and 64 is compared during cooling operation (symbol 74) to only a lower predetermined value (e.g., 12° F.), rather to both lower and higher predetermined values as described above. Those skilled in the art will also appreciate that there are a variety of parameters which must be considered in selecting the predetermined comparison value, including the tonnage of the air conditioner, the air flow rate through the evaporator, and the location of the thermistors in the airstream.

Returning to the present example (FIG. 4), if the temperature difference across A coil 52 is determined (symbol 74) to be less than or equal to 12° F., or greater than or equal to 30° F., an incipient failure of the environmental control system is anticipated and indicated by the inventive apparatus. Thus, branching rightward from symbol 74, it can be seen that the indicator apparatus alarm is initialized or activated, in which case LED 34 will flash, and an audible signal such as a buzzer will emanate from speaker 36 if switch 38 is closed. As shown in buzzer branch 76 of the logic flowing from symbol 78, the buzzer may be disabled by opening switch 38. Although the buzzer may be disabled, LED 34 will continue to flash until the thermostat mode is changed to "off" or "heating", or until the problem with the environmental control system has been corrected to bring the sensed temperature difference across A coil 52 into its proper operating range, above 12° F. and below 30° F. Note that although the alarm may be activated (symbol 78), the environmental control system has not yet completely failed. Thus the occupants may still be provided with some level of comfort while awaiting repairs, or the warned occupant may alternatively choose to turn off the environmental control system at the thermostat, thereby possibly averting damage to the system.

Returning now to symbol 70, if cooling is not called for according to the thermostat signal, the logic branches to the right, to symbol 80, and the inquiry is made as to whether heating is called for. If heating is not called for, the logic will branch upward from symbol 80 to the input of symbol 66, and the logic will enter a new cycle. If heating is called for, the logic branch follows a rightward path from symbol 80 to symbol 82, wherein a comparison of thermostats 62 ($T_1$) and 64 ($T_2$) is made. Here, where heating is called for, it will be understood that downstream thermistor 64 should be at a higher temperature than upstream thermistor 62, and so rather than taking a difference between $T_1$ and $T_2$, as shown in symbol 74, the difference between $T_2$ and $T_1$ is taken. This difference is compared with a predetermined value of 7° F. As discussed above regarding predetermined values 12° F. and 30° F., it is envisioned that predetermined values slightly smaller and/or larger than 7° F. may provide adequate performance for assessing heating performance. As mentioned above, the sensitivity or stability of the indicator apparatus may be compromised by choosing alternative predetermined values, however.

If the sensed temperature difference across A coil 52 is greater than 7° F., no incipient failure of the environmental control unit is detected and if the logic path returns to the input of symbol 72. If the sensed temperature difference across A coil 52 is less than or equal to 7° F., however, the logic branches downward from symbol 82 to activate the alarm (symbol 78) as described above with respect to a detected incipient failure of the cooling system. As noted above, those skilled in the art will recognize that a similar control logic may be implemented which will actuate an alarm should a sensed temperature difference across the heat exchanger be significantly greater than a predetermined value, which may be indicative of degraded airflow performance.

As mentioned above, in the event of the alarm (symbol 78) being activated, the occupants would then contact the appropriate repair facility to have the matter investigated and corrected. Alternatively, the inventive incipient failure indicator apparatus may be provided with an optional notification system which, upon activation of the alarm (symbol 78), would activate another, remote alarm system (symbol 84, FIG. 4), which may be dedicated to environmental control system monitoring via a telephone line, for example, or which may be tied into a preexisting building alarm system, to provide notification of the incipient environmental control system failure to persons located outside of the building served by the environmental control system. A dedicated remote alarm system may provide instant notification to an appropriate repair facility that an incipient failure of the environmental control system has been detected, and the repair personnel may then quickly respond to the alarm, providing shorter time to repair a failed system or correcting the problem from complete failure occurs.

Referring now to FIG. 5, there is shown an alternative environmental control system unit to which the inventive incipient failure indicating apparatus is adapted. Rather than being a heat pump system, environmental control unit 46a is a combination furnace and air conditioner unit of the type well known in the art, which, like heat pump unit 46 (FIG. 3), comprises filter 58, blower 50 and A coil 52a, which serves solely as the evaporator for an air conditioner refrigerant system (not shown), disposed within housing 48a. Additionally, unit 46a includes heat exchanger (or heater core) 86 by which the furnace transfers heat to the air flowing through housing 48a. As is usual, hot combustion gases from a burner flow through the interior passages of heater core 86.

Under the influence of blower 50, air flows upward within housing 48a, as indicated by arrows 60, through filter 58, blower 50 itself, heater core 86 and A coil 52a to ductwork 54. Thermistors 62 and 64 are respectively placed upstream and downstream of both heater core 86 and A coil 52a, thereby measuring the temperature difference across both heat exchangers, only one of which is operation at a given time, depending on whether heating or cooling is being called for by the thermostat. Thus, in combination unit 46a, thermistors 62 and 64 may, as in the case of heat pump unit 46, be used to determine the assessed difference in both the heating and cooling modes. The logic associated with detecting an incipient failure of environmental control unit 46a is essentially identical to that shown in FIG. 4, with the exception that no auxiliary heater signal will be received or included in any logical determination.

Referring now to FIG. 6, there is shown a second embodiment of a combination air conditioning and furnace environmental control unit to which the inventive incipient failure indicator apparatus is adapted. Environmental control unit 46b is identical to environmental control unit 46a (FIG. 5) with the exception that instead of providing only two thermistors, 62,64, respectively disposed upstream and downstream of both heat exchanger 86 and A coil 52a, the incipient failure indicator apparatus adapted to unit 46b includes three thermistors. Thermistors 62 and 64 are respectively disposed in the air stream upstream and downstream of heater core 86. Thermistor 64 is also disposed upstream of A coil 52a, while third thermistor 88 is disposed downstream of A coil 52a. With reference again to FIG. 4, thermistor 88 provides a third thermistor input $T_3$ to the control logic of indicator unit 26, as shown in ghosted lines. According to this alternative embodiment, symbol 74 of the flowchart is replaced with symbol 74a, shown in ghosted line. Thus, when cooling is called for, the difference between temperatures sensed by thermistors 64 ($T_2$) and 88 ($T_3$) will be compared with the predetermined values of 12° F. and 30° F., the remainder of the logic associated with FIG. 4 otherwise unchanged. Those skilled in the art will now understand that A coil 52a may be provided with a dedicated pair of thermistors upstream and downstream thereof, with thermistors 62 and 64 dedicated to determining the temperature difference across heat exchanger 86 alone.

Returning again to the flow chart of FIG. 4 (symbol 66), if a thermostat or auxiliary heating signal is recognized, the logic also proceeds rightward along filter maintenance branch 90. The logic flows along branch 90 through reset time switch 42, and a timer provided in the control board of indicator unit 26 assesses the accumulated blower run time. If the accumulated blower running time is greater than 480 hours, the logic continues rightward from symbol 92 to illuminate LED 40. If the blower running time is less than or equal to 480 hours, the logic loops back to the input to symbol 92, whereby the timer continues to run during times the blower signal is received by indicator unit 26. Thus the counter associated with symbol 92 accumulates only that time in which blower 50 (FIGS. 3, 5 and 6) is actually in operation, which has a direct bearing on filter life. Once the filter has been cleaned or replaced, the occupant will press reset time switch 42, which will reset the timer associated with symbol 92. Alternatively, this aspect of the present invention may be simplified somewhat by illuminating lamp 40 every 480 hours following reset of switch 42 regardless of whether a blower signal is received. According to such an embodiment, wherein lamp 40 will illuminate after a period of time regardless of how much blower 50 has operated during that period, the illumination of lamp 40 is to be regarded as a reminder to the occupant to check the condition of filter 58, and to replace it as required. The filter timer would be reset to illuminate lamp 40 after another 480 hours have passed by depressing switch 42. Another alternative embodiment would base the filter service time period on accumulated compressor running time, rather than on accumulated blower running time. Compressor operation is closely related to blower operation, especially if the environmental control unit is a heat pump or during air conditioner operation of a combination environmental control unit. In some applications, an indication that the compressor is being powered may be more readily obtained than an indication that the blower is being powered. Further, the logic of the inventive incipient failure indicator apparatus may also be adapted to flash lamp 40 in the event of a sensor failure, alerting the occupant to the need for an appropriate repair.

Referring now to FIG. 7, a flowchart similar to the one seen in FIG. 4 is presented. The operational flow is the same as that of FIG. 4 with certain key exceptions.

Beginning with the signals received as input to the system, the blower signal of the previous embodiments has been replaced with a conditioned air blower signal. This change allows the timer to monitor the amount of the time the conditioned air blower has been running whether the compressor is activated or not. For example, in the fall and spring, neither heating nor cooling may be called for, but a person in the living space may wish to "have some air movement" by activating the conditioned air blower. Another example is when the "continuous fan" mode is selected. The compressor will cycle with the thermostat, but the blower runs continuously. The time that the conditioned air blower is running, even without the compressor, affects the performance of the air filter, thus monitoring the actual run time of the conditioned air blower is essential. The replacement of the blower signal with the conditioned air blower signal is continued to decision block 96 for determining whether the conditioned air blower has been running for an accumulated 20 days of time. Again, if the answer is "yes" the operational flow continues to block 40 and the replace filter lamp is activated.

An associated improvement to the monitoring of the conditioned air blower is the inclusion of an electronically erasable programmable read only memory (EEPROM) in block 98. The inclusion of the EEPROM allows for the retention of the amount of time accumulated due to the conditioned air blower running even if the power should fail or be removed for a substantial period of time. The data contained in the EEPROM is only erased when it is reset, not during a blackout. Thus the time accumulated in the running of the conditioned air blower may be maintained reliably for better operation of the system.

The other great difference in this embodiment of the present invention is the capability of remote alarm notification. The generic alarm system 84, in FIG. 4, has been replaced with decision block 94 which calls for a determination as to whether the alarm has been activated for an hour or longer. If the alarm system has been activated for an hour or longer, then a signal is to be sent to a remote location (not shown) informing a person, such as the owner, a technician, or other person equipped to handle the situation, of the alarm condition. This communication may be done in various forms including via the Internet, electronic mail, and conventional telephone means.

Other minor improvements have also been made and are depicted in FIG. 7. The temperature differential between $T_2$ and $T_1$ in block 82 has been reduced to 5° F. Additionally, in decision block 66, the determination has been changed to only whether the TS signal is present since the AH signal presence is determined in decision block 72. These improvements have been made for clarification of the operation of this embodiment of the invention.

FIG. 8 depicts a block diagram of the structure of the circuit board with the improvements made in this embodiment. One will note that the EEPROM is included on the board, as well as a dry contact relay, which is the operational element of the remote alarm system. The signal for the conditioned air blower is also found on the board, replacing the signal for the blower when the compressor is operating.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An incipient failure indication apparatus for an environmental control system, said system controlling the temperature of the air in a living space, said system including a heat exchanger through which air flows and a temperature control thermostat, said thermostat located in said living space, said apparatus comprising:

an indicator mounted substantially adjacent to the thermostat, said indicator including an alarm and a control board, said alarm in communication with said control board, said control board in communication with the said thermostat, said alarm comprising one of a visual indicator and an aural indicator for attracting the attention of a person in said living space to said indicator upon activation of said alarm;

a first temperature sensor disposed on the upstream side of the said heat exchanger, a second temperature sensor disposed on the downstream side of the said heat exchanger, said temperature sensors respectively sensing the temperature of the air on the upstream and downstream sides of the heat exchanger, said first and second temperature sensors in communication with said control board, said control board having a comparator which compares the temperatures sensed by said first and second temperature sensors, and an activator for activating said alarm in response to a determination by said comparator of a difference in temperatures sensed by said first and second temperature sensors which is one of less than and greater than a predetermined value; and a remote alarm activator for activating a remote alarm, whereby persons outside of said living space are notified of an incipient failure of the environmental control system.

2. An incipient failure indication apparatus according to claim 1, further including an activation element for activating said remote alarm, whereby said activation element activates said remote alarm only after the activation of said alarm for at least one hour.

3. An incipient failure indication apparatus of claim 1 and including a replaceable air filter in fluid communication with the heat exchanger for cleaning the air which flows through the heat exchanger, wherein said apparatus includes a timer, and said indicator including a filter service time indicator and a reset switch in communication with said timer, said apparatus including means for activating said filter service time indicator a predetermined period after activation of said reset switch.

4. An incipient failure indication apparatus according to claim 3, wherein said timer further comprises a memory storage device.

5. An incipient failure indication apparatus according to claim 4, wherein said memory storage device is an electronically erasable programmable read only memory.

* * * * *